United States Patent
Brown et al.

[11] Patent Number: 5,221,514
[45] Date of Patent: Jun. 22, 1993

[54] METHOD FOR REPLACING A FUEL ASSEMBLY GUIDE PIN

[75] Inventors: Steve K. Brown, Lynchburg; Larry D. Dixon, Forest; Dale E. Matthews, Lynchburg, all of Va.

[73] Assignee: B&W Nuclear Service Company, Lynchburg, Va.

[21] Appl. No.: 929,046

[22] Filed: Aug. 13, 1992

Related U.S. Application Data

[62] Division of Ser. No. 726,671, Jul. 8, 1991, Pat. No. 5,164,154.

[51] Int. Cl.⁵ .............................................. G21C 5/06
[52] U.S. Cl. .................................. 376/260; 29/402.06; 29/402.11; 29/402.14
[58] Field of Search ............... 376/260, 362, 364, 446; 29/402.03, 402.06, 402.08, 402.11, 402.12, 402.14, 906

[56] References Cited

U.S. PATENT DOCUMENTS 5,030,413   7/1991   Knierriem et al. ................. 376/364

Primary Examiner—Daniel D. Wasil
Attorney, Agent, or Firm—Robert J. Edwards; D. Neil LaHaye

[57] ABSTRACT

A method and apparatus for replacing an existing fuel guide pin in an upper core plate of a nuclear fuel assembly. The existing guide pin is removed to the level of the bottom of the core plate and inside the bore in the core plate to a point adjacent the pin retaining nut. A longitudinal bore is then created in the remaining portion of the existing fuel guide pin. A replacement fuel guide pin formed from a pin body, collet lock, and bolt is inserted into the bore in the upper core plate and through the bore in the remaining portion of the existing pin. The bolt and collet lock are inserted into bore at opposite ends of the pin body and threaded together. A tapered shoulder at one end of the collet lock passes through the bore created in the existing guide pin and secures the replacement guide pin to the remaining portion of the existing pin.

1 Claim, 2 Drawing Sheets

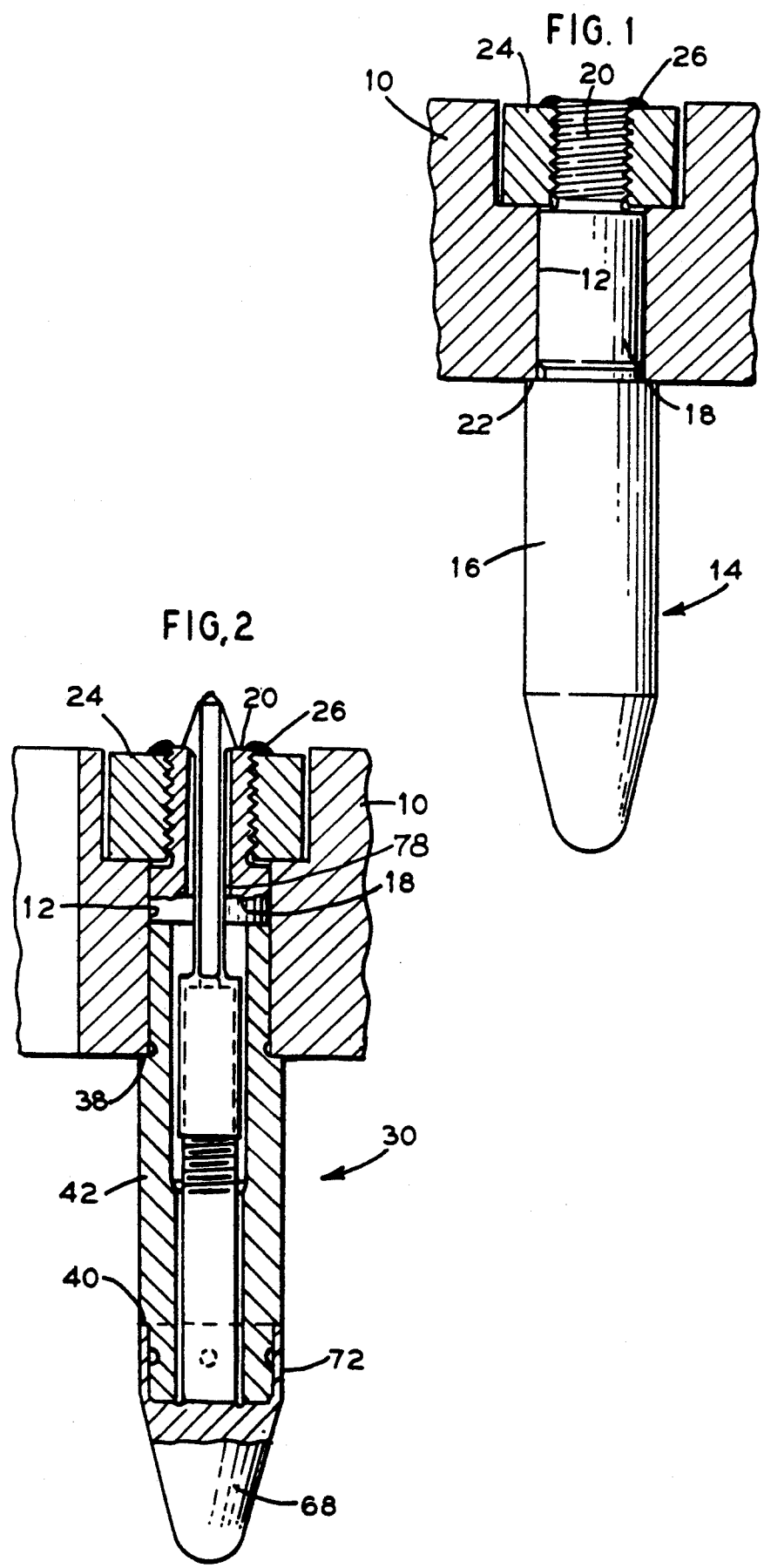

FIG. 3
FIG. 5
FIG. 7
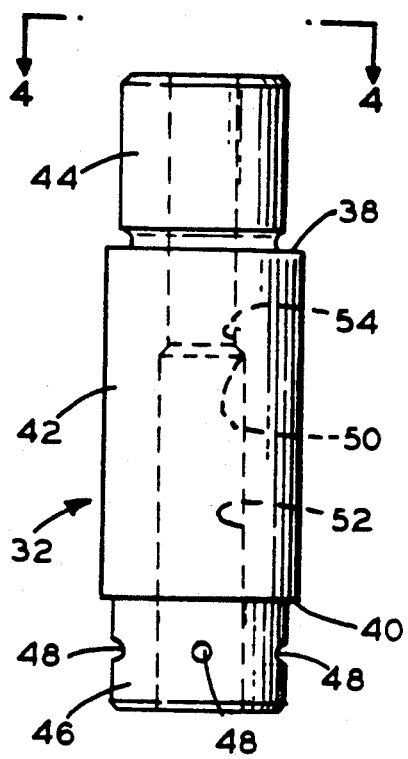
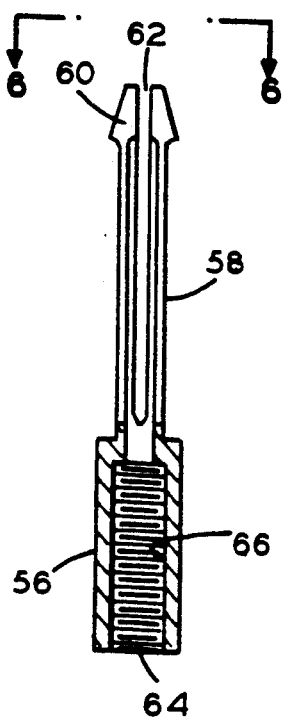
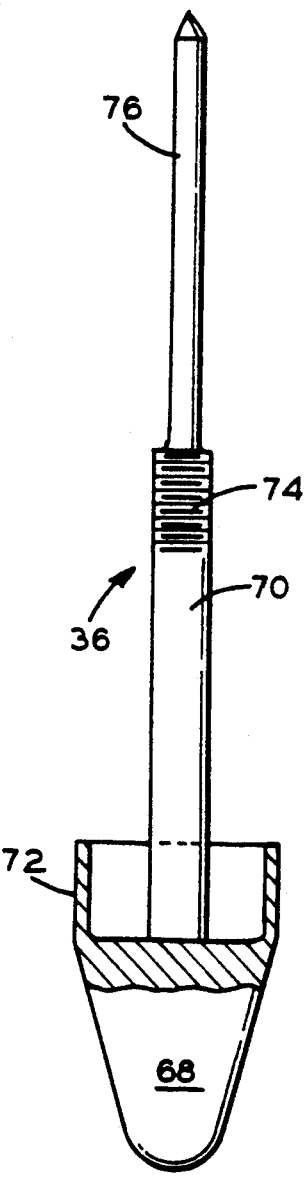
FIG. 4
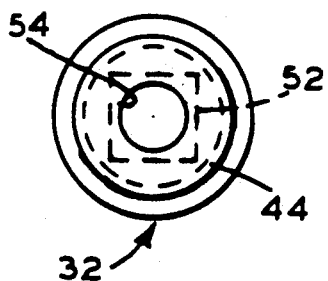
FIG. 6
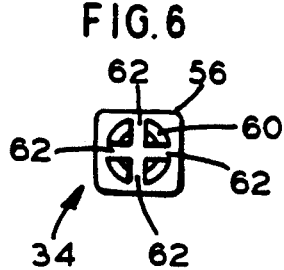

METHOD FOR REPLACING A FUEL ASSEMBLY GUIDE PIN

This application is a division of application Ser. No. 07/726,671, filed Jul. 8, 1991, now U.S. Pat. No. 5,164,154.

BACKGROUND OF THE INVENTION

1. Field of the Invention

The present invention is generally related to guide pins for a nuclear reactor fuel assembly and more particularly to the replacement of existing guide pins.

2. General Background

In commercial nuclear reactors fuel guide pins extend down from the upper core plate into guide tubes in the fuel assemblies This aids in maintaining proper alignment of the fuel assemblies with the pressure vessel so that the control rods operate properly. During initial construction of the reactor each guide pin is inserted into a bore in the upper core plate from the bottom of the plate and threadably secured with a nut at the top of the core plate. The nut is then welded to the pin to prevent loosening during service. After construction is completed and operation begun, fuel guide pins may need to be replaced due to a defect or the fuel guide pin becoming bent. A problem encountered in replacing fuel guide pins is that the top of the upper core plate is very difficult to access. This makes removal of the nut from the top of the core plate very difficult and time consuming.

SUMMARY OF THE INVENTION

The present invention addresses the above problem in a straightforward manner. What is provided is a method and apparatus where the existing pin is removed by cutting it near the bottom of the upper core plate. A removal process such as EDM (electrical discharge machining) is then used to remove that portion of the pin remaining within the plate to a level slightly below its retaining nut. The removal process is continued to bore a hole through the remaining part of the pin. A replacement pin is then inserted into the plate from the bottom and through the hole in the remaining part of the original pin. The replacement pin has a collet lock with a tapered shoulder at its upper and that allows it to go through the hole in the original pin but not to come back out. The replacement pin body is provided with a bore to receive the collet lock. A bolt fits through the replacement pin body and threadably engages the collet, spreads the tapered shoulder, and secures the replacement pin and the remaining portion of the original pin and its retaining nut in position.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 1 illustrates the existing fuel guide pin to be replaced.

FIG. 2 illustrates the invention in its installed position.

FIG. 3 is a side view of the main body portion of the invention.

FIG. 4 is a view taken along lines 4—4 in FIG. 3.

FIG. 5 is a side sectional view of the collet lock of the invention.

FIG. 6 is a view taken along lines 6—6 of FIG. 5.

FIG. 7 is a side view of the bolt of the invention.

DETAILED DESCRIPTION OF THE PREFERRED EMBODIMENT

FIG. 1 illustrates a small portion of an upper core plate 10 from a nuclear reactor. Upper core plate 10 is provided with bore 12 therethrough for receiving fuel guide pin 14. Fuel guide pin 14 may generally be broken down into lower, central, and upper sections 16, 18, 20 respectively. Shoulder 22 is provided between lower section 16 and central section 18 and provides a bearing surface against the bottom of upper core plate 10. Central section 18 is of a smaller diameter than lower section 16 and sized to closely fit within bore 12. Upper section 20 is threaded to receive nut 24. Nut 24 is received in the larger countersink portion of bore 12 at the upper end of upper core plate 10. Weld 26 secures fuel guide pin 14 and nut 24 together to prevent the release of damaging loose parts in the nuclear steam supply system.

The present invention, generally indicated by the numeral 30 in FIG. 2, provides a method and apparatus for replacing fuel guide pin 14. As seen in FIGS. 3-7, replacement fuel guide pin 30 is generally comprised of pin body 32, collet lock 34, and bolt 36.

As seen in FIGS. 3 and 4, pin body 32 is circular in cross section. Pin body 32 is provide with upper and lower shoulders 38, 40 on either end of central body portion 42. Upper body portion 44 is narrower in diameter than central body portion 42 and sized to closely fit within the lower portion of bore 12 in upper core plate 10. Lower body portion 46 is narrower in diameter than central body portion 42 and sized to be received by the head of bolt 36. There are 4 hemispherical dimples 48, located 90 degrees apart, around the periphery of lower body portion 46, the purpose of which will be explained below. Pin body 32 is provided with longitudinal bore 50 therethrough. As seen in FIGS. 3 and 4, the upper portion 52 of bore 50 is rectangular while the lower portion 54 of bore 50 is circular and of a smaller diameter. Lower portion 54 is sized to receive bolt 36. Upper portion 52 is sized to receive collet lock 34.

As seen in FIGS. 5 and 6, collet lock 34 is formed from main body portion 56 which is substantially rectangular or square in cross section, an upper portion 58. Upper portion 58 is of lesser diameter than main body portion 56 and is provided with tapered shoulder 60 at its end. Upper portion 58 and tapered shoulder 60 are circular in cross section and provided with slots 62 that extend axially along their length. Main body portion 56 and upper portion 58 are provided with central bore 64 that extends along the full length of collet lock 34 for receiving bolt 36. The interior of main body portion 56 is provided with threads 66 for threadably receiving bolt 36.

Bolt 36 is formed from head 68 and shank 70 extending upwardly therefrom. As seen in FIG. 7, head 68 is tapered and provided with relatively thin sidewall 72 that meets with shoulder 40 on pin body 32. Sidewall 72 may be crimped into dimples 48 to secure pin body 32 and bolt 36 together and prevent bolt 36 from turning. Shank 70 is provided with threaded central portion 74 and upper portion 76 that has a reduced diameter and is sized to fit through bore 64 in collet lock 34. Upper portion 76 serves as a spreader to spread tapered shoulder 60 outwardly into a secure locking position against nut 24.

During operations to replace existing fuel guide pin 14, equipment known in the industry is used to remove lower section 16 adjacent the bottom of upper core plate 10. The central section 18 of pin 14 remaining within upper core plate 10 is then removed to a level adjacent its retaining nut 24 by a suitable method such as electrical discharge machining. The central portion of the remaining part of existing pin 14 is then removed by a suitable method such as electrical discharge machining to create a longitudinal bore 78 therethrough as seen in FIG. 2. Replacement fuel guide pin 30 is then inserted into the bottom of upper guide plate 10 and through the longitudinal bore 78 in the remaining portion of pin 14. Replacement fuel guide pin 30 is locked onto the remaining portion of the existing fuel guide pin 14 by tapered shoulder 60 on collet lock 34. Before insertion of replacement pin 30 into upper core plate 10 and through the bore in the remaining portion of pin 14, bolt 36 is inserted into the lower end of pin body 32 and collet lock 34 is inserted into the top end of pin body 32. Threads 66 in collet lock 34 are engaged with threaded portion 74 on bolt 36 only to an extent that they will retain collet lock 34 and bolt 36 in pin body 32. The flat sides of main body portion 56 prevents collet lock 34 from turning while in upper portion 52 of bore 50. During insertion through bore 78 created in the remaining portion of existing fuel guide pin 14, slots 62 allow tapered shoulder 60 to flex inwardly and pass through bore 78. Once through bore 78, tapered shoulder 60 naturally flexes outwardly to prevent removal. Bolt 68 is then turned to cause it to further engage threads 66 in collet lock 34. As it does so upper portion 76 of shank 70 extends further into bore 64 in collet lock 34 causing tapered shoulder 60 to spread outwardly. This also draws collet lock 34 and tapered shoulder 60 downwardly against the top portion of the existing pin 14 to insure that replacement fuel guide pin 30 is locked onto the remaining portion of existing fuel guide pin 14. Sidewall 72 of bolt head 36 is crimped into dimples 48 to prevent bolt 36 from turning and unscrewing from collet lock 34. Bolt head 36 may be provided with flats or a slot for turning purposes or a suction cup arrangement may also be used. As an alternative, pin body 32 may be provided with threads on upper body portion 44 and threaded into bore 12 in upper core plate 10.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for replacing an existing fuel assembly guide pin in an upper core plate of a nuclear reactor system, comprising the steps
    a. removing the lower portion of the existing pin adjacent the bottom of the upper core plate;
    b. removing the section of the existing pin remaining within the upper core plate to a level adjacent the pin retaining nut;
    c. removing the central portion of the remaining part of the existing pin to create a longitudinal bore therethrough;
    d. inserting a replacement fuel assembly guide pin into the bottom of the upper core plate and through the longitudinal bore created in the existing pin; and
    e. locking the replacement fuel assembly guide pin onto the remaining portion of the existing fuel assembly guide pin.

* * * * *